United States Patent
Liu et al.

(10) Patent No.: US 9,197,295 B2
(45) Date of Patent: Nov. 24, 2015

(54) DOUBLE-STREAM BEAMFORMING METHOD AND DEVICE

(71) Applicant: China Academy of Telecommunications Technology, Beijing (CN)

(72) Inventors: Long Liu, Beijing (CN); Qiong Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/386,340

(22) PCT Filed: Dec. 26, 2012

(86) PCT No.: PCT/CN2012/087586
§ 371 (c)(1),
(2) Date: Sep. 19, 2014

(87) PCT Pub. No.: WO2013/139163
PCT Pub. Date: Sep. 26, 2013

(65) Prior Publication Data
US 2015/0049826 A1     Feb. 19, 2015

(30) Foreign Application Priority Data
Mar. 20, 2012   (CN) .......................... 2012 1 0074892

(51) Int. Cl.
| | |
|---|---|
| H04B 7/02 | (2006.01) |
| H04L 1/02 | (2006.01) |
| H04B 7/04 | (2006.01) |
| H04B 7/06 | (2006.01) |
| G01S 3/74 | (2006.01) |
| H04B 7/08 | (2006.01) |
| H04L 1/00 | (2006.01) |
| H04W 16/28 | (2009.01) |
| H04W 64/00 | (2009.01) |

(52) U.S. Cl.
CPC ............... *H04B 7/0408* (2013.01); *G01S 3/74* (2013.01); *H04B 7/0413* (2013.01);
(Continued)

(58) Field of Classification Search
CPC ..... H04L 1/06; H04L 1/0618; H04L 25/0204; H04B 7/0417
USPC ......................................................... 375/267
See application file for complete search history.

(56) References Cited

U.S. PATENT DOCUMENTS

2009/0323847 A1    12/2009   Na et al.

FOREIGN PATENT DOCUMENTS

| CN | 101364828 A | 2/2009 |
|---|---|---|
| CN | 101459457 A | 6/2009 |

(Continued)

OTHER PUBLICATIONS

International Search Report for PCT/CN2012/087586.
(Continued)

*Primary Examiner* — Tanmay Shah
(74) *Attorney, Agent, or Firm* — Kilpatrick Townsend & Stockton LLP

(57) ABSTRACT

Disclosed are a double-stream beamforming method and device, which relate to communication technology. The method comprises: first, according to a DOA angle, determining an array response vector; then according to the array response vector, in accordance with the number of each group of transmission antennae of a base station, distributing parameters to generate two groups of coefficients, and according to the two groups of coefficients, conducting beamforming on the antennae. There is no need to conduct characteristic value decomposition to obtain a characteristic vector, thereby reducing the double-stream beamforming complexity.

18 Claims, 4 Drawing Sheets

(52) U.S. Cl.
CPC ........... *H04B 7/0456* (2013.01); *H04B 7/0617* (2013.01); *H04B 7/0691* (2013.01); *H04B 7/0697* (2013.01); *H04B 7/086* (2013.01); *H04B 7/0897* (2013.01); *H04L 1/00* (2013.01); *H04W 16/28* (2013.01); *H04W 64/006* (2013.01)

(56) References Cited

FOREIGN PATENT DOCUMENTS

| CN | 101459457 B | * | 6/2009 |
| CN | 101594176 A | | 12/2009 |
| CN | 101848021 A | | 9/2010 |
| CN | 101848021 B | * | 9/2010 |
| CN | 101938302 A | | 1/2011 |
| WO | 2010050874 A1 | | 5/2010 |

OTHER PUBLICATIONS

Lilei Wang et al., "Power offset compensation schemes between CRS and DRS for downlink dual layer beamforming in L TE system", 4 pages.

An Office Action issued on Jun. 30, 2015 in the CN counterpart application (201210074892.0).

* cited by examiner

DOUBLE-STREAM BEAMFORMING METHOD AND DEVICE

The present application is a US National Stage of International Application No. PCT/CN2012/087586, filed Dec. 26, 2012, designating the United States, and claiming the benefit of Chinese Patent Application No. 201210074892.0, filed with the Chinese Patent Office on Mar. 20, 2012, and entitled "Method of and apparatus for dual-stream beamforming", both of which are hereby incorporated by reference in their entireties.

FIELD

The present invention relates to the field of communications and particularly to a method of and apparatus for dual-stream beamforming.

BACKGROUND

In recent years, radio spectrum resources become increasingly insufficient along with the rapid advancement of mobile communications and the development of other radio applications, so it is necessary to further improve the capacity of a system and the spectrum utilization ratio of the system so as to accommodate a larger number of subscribers and the deployment of new services.

The technology of Multiple-In-Multiple-Out (MIMO) has been widely applied to thereby make it possible to transmit multiple data streams in space. Beamforming can extend a coverage range, improve the quality of a signal, enhance the capability to penetrate through a building and increase the throughput of a subscriber at the edge of a cell due to its definitely directed beam and consequently has been widely applied.

In an existing dual-stream beamforming solution, a channel estimation related matrix is eigen-value decomposed into two sets of eigen-vectors corresponding to the maximum and second maximum eigen-values in a traditional Eigen-value Based Beamforming (EBB) algorithm, and the conjugation of the two eigen-vectors is used as weight coefficients for dual-stream beam forming on a transmit antenna of a base station. A particular flow thereof as illustrated in FIG. 1 includes the following steps:

The step S101 is to perform uplink channel estimation using an uplink pilot to derive a channel matrix H;

The step S102 is channel related matrix $R=H^H H$; and

The step S103 is eigen-value decompose the related matrix into two sets of eigen-vectors corresponding to the maximum and second maximum eigen-values as weight coefficients of antennas.

In this solution, the two eigen-vectors need to be calculated complexly as a result of eigen-value decomposition, and also the eigen-vectors may be determined poorly this way when the uplink pilot is transmitted by a user equipment over the same antenna.

SUMMARY

Embodiments of the invention provide a method of and apparatus for dual-stream beamforming so as to lower the complexity of dual-stream beamforming.

An embodiment of the invention provides a dual-stream beamforming method including:

determining Direction Of Arrival (DOA) angles of antennas;

determining array response vectors from the DOA angles;

generating two sets of coefficients from the array response vectors by allocating parameters according to the numbers of respective sets of transmit antennas of a base station; and performing beamforming respectively for two sets of antennas by the two sets of coefficients.

An embodiment of the invention provides a dual-stream beamforming apparatus including:

an angle determination unit is configured to determine Direction Of Arrival (DOA) angles of antennas;

a vector determination unit is configured to determine array response vectors from the DOA angles;

a coefficient determination unit is configured to generate two sets of coefficients from the array response vectors by allocating parameters according to the numbers of respective sets of transmit antennas of a base station; and a beamforming unit is configured to perform beamforming respectively for two sets of antennas by the two sets of coefficients.

The embodiments of the invention provide a method of and apparatus for dual-stream beamforming, where firstly array response vectors are determined from Direction Of Arrival (DOA) angles; and then two sets of coefficients are generated from the array response vectors by allocating parameters according to the numbers of respective sets of transmit antennas of a base station, and beamforming is performed for the antennas by the two sets of coefficients without deriving any eigen-vector as a result of eigen-value decomposition, thus lowering the complexity of dual-stream beamforming.

DETAILED DESCRIPTION

Embodiments of the invention provide a method of and apparatus for dual-stream beamforming, where firstly array response vectors are determined from DOA angles; and then two sets of coefficients are generated from the array response vectors by allocating parameters according to the numbers of respective sets of transmit antennas of a base station, and beamforming is performed for the antennas by the two sets of coefficients without deriving any eigen-vector as a result of eigen-value decomposition, thus lowering the complexity of dual-stream beamforming.

Figure 1:
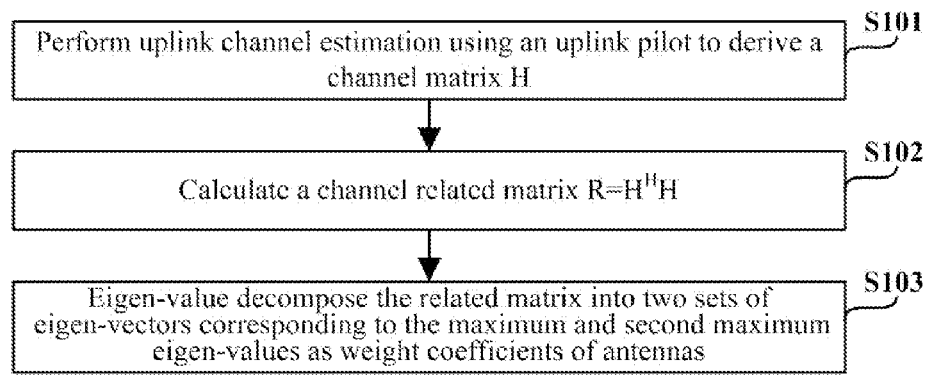
FIG. 1 is a flow chart of a method of dual-stream beamforming in the prior art.
Figure 2:
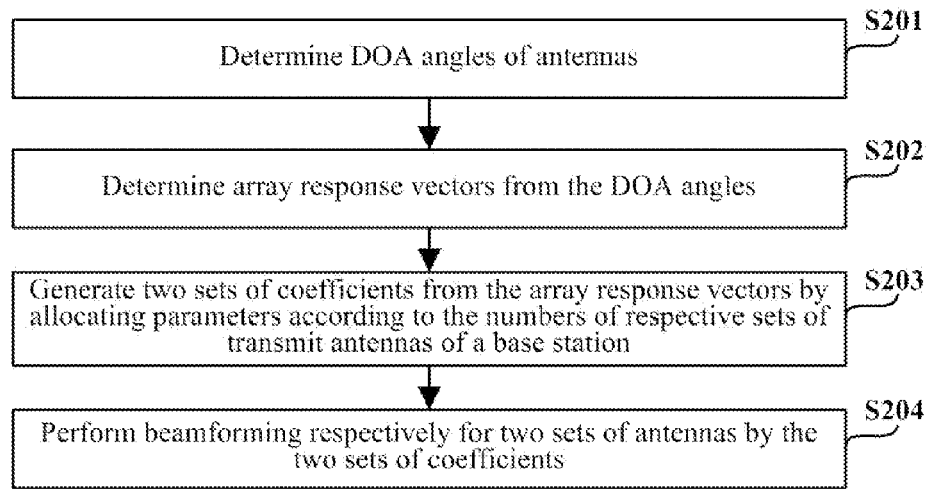
FIG. 2 is a flow chart of a method of dual-stream beamforming of embodiments of the invention.

As illustrated in FIG. 2, the method of dual-stream beamforming of the embodiments of the invention includes the following steps:

The step 201 is to determine DOA angles of antennas;

The step 202 is to determine array response vectors from the DOA angles;

The step 203 is to generate two sets of coefficients from the array response vectors by allocating parameters according to the numbers of respective sets of transmit antennas of a base station; and The step 204 is to perform beamforming respectively for two sets of antennas by the two sets of coefficients.

The DOA angles of the antennas are derived and the coefficients of beamforming for the antennas are determined from the DOA angles without any eigen-value decomposition, thus lowering effectively the complexity of beamforming.

The method of dual-stream beamforming according to the embodiments of the invention will be described below in details in connection with particular embodiments thereof.

First Embodiment

A set of array response vectors V is calculated from estimated DOA angles and conjugated, and two sets of coefficients V1 and V2 are generated by allocating parameters according to the numbers of respective sets of transmit antennas of a base station, where the dimensionality of V1 and V2 is V, and V1 has the same first half as a first half of conjugated V and a zero-padded second half, and V2 has the same second half as a second half of conjugated V and a zero-padded first half.

Due to limited power of each antenna, the limited power is set to P, and V1 and V2 are normalized in amplitude and multiplied with the square root of P as weight coefficients of the antennas to be applied to dual-stream beamforming.

Particularly in this embodiment, the step S201 particularly includes:

Uplink channel estimation is performed using an uplink pilot of a full bandwidth or a preset sub-band to determine a channel matrix;

A channel related matrix is determined from the channel matrix; and

The DOA angles of the antennas are determined from the channel related matrix.

The DOA angles of the antennas can be determined from the channel related matrix by estimating the DOA angles in a Grids of Beams (GOB) algorithm. Of course those skilled in the art can alternatively estimate otherwise the DOA angles.

In the step S202, the array response vectors can be determined from the DOA angles particularly by determining the respective array response vectors as $V=e^{j2\pi[0:N_t-1]d \sin \theta_{DOA}}$, where $N_t$ represents the number of transmit antennas of the base station, d represents the spacing between the antennas of the base station, $[0:N_t-1]$ represents $N_t$ values from 0 to $N_t-1$, i.e., the n-th element is $v_n=e^{j2\pi(n-1)d \sin \theta_{DOA}}$ in the array response vector, and n represents an integer smaller than or equal to $N_t$.

At this time, in the step S203 generating the two sets of coefficients by allocating the parameters according to the numbers of the respective sets of transmit antennas of the base station after conjugating the array response vectors particularly includes the steps of:

Determining the dimensionality of the two sets of coefficients to be the same as the dimensionality of the array response vectors;

Determining parameters of a first half of the first set of coefficients to be the same as parameters of a first half of the conjugated array response vectors and determining parameters of a second half of the first set of coefficients to be zero; and Determining parameters of a second half of the second set of coefficients to be the same as the parameters of the first half of the conjugated array response vectors and determining parameters of a first half of the second set of coefficients to be zero.

The array response vectors can alternatively be determined as $V=e^{-j2\pi[0:N_t-1]d \sin \theta_{DOA}}$, and at this time, the step S203 particularly includes the steps of:

Determining the dimensionality of the two sets of coefficients to be the same as the dimensionality of the array response vectors;

Determining parameters of a first half of the first set of coefficients to be the same as parameters of a first half of the array response vectors and determining parameters of a second half of the first set of coefficients to be zero; and Determining parameters of a second half of the second set of coefficients to be the same as the parameters of the first half of the array response vectors and determining parameters of a first half of the second set of coefficients to be zero. p The array response vectors can alternatively be determined as $V=e^{-j2\pi[0:N_t/2-1]d \sin \theta_{DOA}}$, and at this time, the step S203 particularly includes the steps of: determining the dimensionality of the two sets of coefficients to be twice the dimensionality of the array response vectors;

Determining parameters of a first half of the first set of coefficients to be the same as parameters of the array response vectors and determining parameters of a second half of the first set of coefficients to be zero; and Determining parameters of a second half of the second set of coefficients to be the same as the parameters of the array response vectors and determining parameters of a first half of the second set of coefficients to be zero.

In the step S204, performing beamforming respectively for the two sets of antennas by the two sets of coefficients particularly includes the steps of:

Normalizing in amplitude the two sets of coefficients;

Determining weight coefficients of the antennas as the product of the normalized coefficients and $\sqrt{P}$, where P represents limited power of the antennas; and Performing beamforming for the two sets of antennas by the weight coefficients of the antennas.

Figure 3:
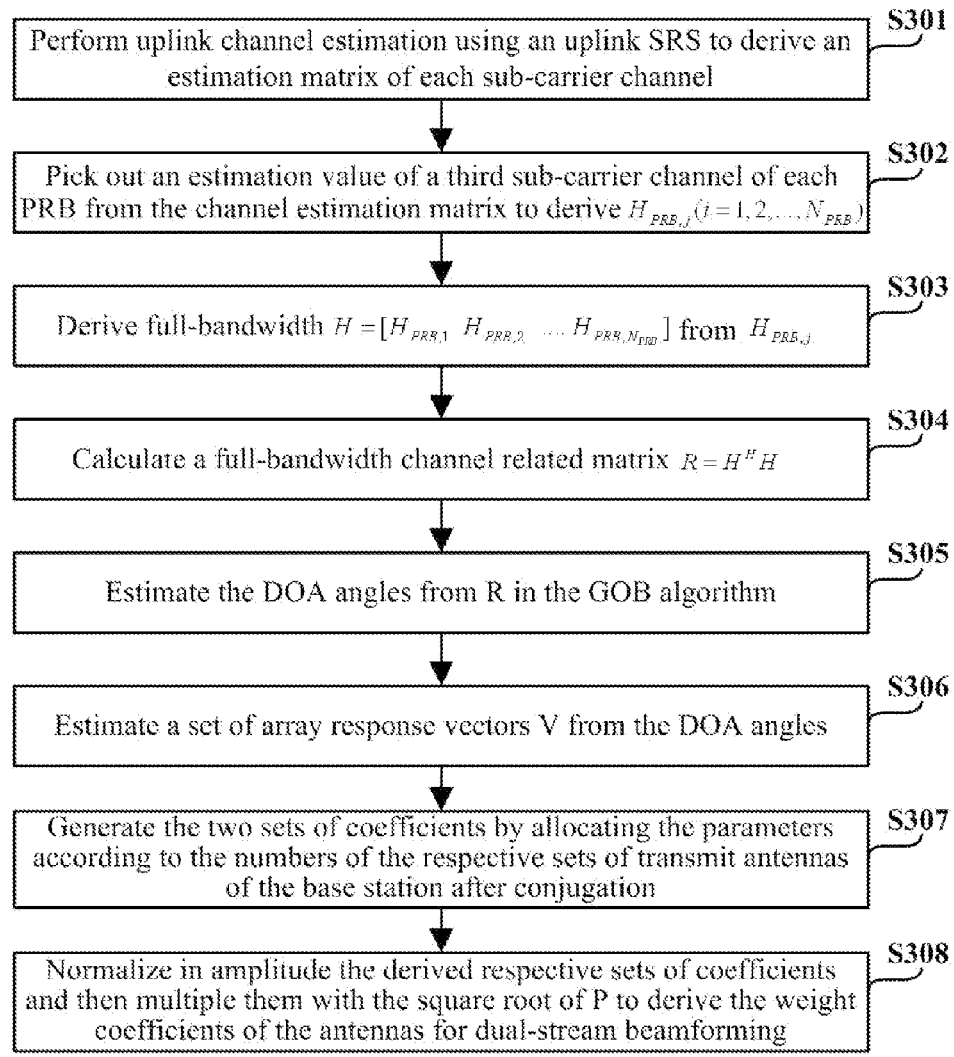
FIG. 3 is a flow chart of a method of dual-stream beamforming in a corresponding first embodiment of the embodiments of the invention.

Particularly in a scenario where a base station of an LTE system is provided with 8 dual-polarized antennas, as illustrated in FIG. 3, dual-stream beamforming in this embodiment particularly includes the following steps:

The step S301 is to perform uplink channel estimation using an uplink Sounding Reference Signal (SRS) to derive an estimation matrix $H_i(i=1, 2, \ldots, 6*N_{PRB})$ of each sub-carrier channel in 1*8 dimensions, where $N_{PRB}$ represents the number of Physical Resource Blocks (PRBs) occupied by a pilot, and as specified in the protocol, a number of SRS's are placed like a comb, and the number of sub-carriers by occupied the SRS's in a PRB is 6;

The step S302, is to pick out estimation value of a third sub-carrier channel of each PRB from the channel estimation matrix $H_i$ to derive $H_{PRB,j}(i=1, 2, \ldots, N_{PRB})$ in 1*8 dimensions;

The step S303 is to derive full-bandwidth $H=[H_{PRB,1} \; H_{PRB,2} \ldots H_{PRB,N_{PRB}}]$ from $H_{PRB,j}$ in $N_{PRB}*8$ dimensions;

The step S304 is to calculate a full-bandwidth channel related matrix $R=H^H H$ in 8*8 dimensions;

The step S305 is to estimate the DOA angles $\theta_{DOA}$ from R in the GOB algorithm;

The step S306 is to estimate a set of array response vectors V in 1*8 dimensions, particularly as $V=e^{j2\pi[0:N_t-1]d \sin \theta_{DOA}}$, from $\theta_{DOA}$, where $N_t$ represents the number of transmit antennas of the base station, and d represents the spacing between the antennas of the base station;

The step S307 is to generate the two sets of coefficients $V_1$ and $V_2$ both in 1*8 dimensions by allocating the parameters according to the numbers of the respective sets of transmit antennas of the base station after conjugating $V_n$:

$V_1(1:4)=V^*(1:4), V_1(5:8)=0$;
$V_2(5:8)=V^*(5:8), V_2(1:4)=0$;
Where V* represents vectors of conjugated V;

In an implementation, the step S306 and the step S307 can alternatively be performed in the following two implementations:

1) $V=e^{-j2\pi[0:N_t-1]d\sin\theta_{DOA}}$, $V_1(1:4)=V(1:4)$, $V_1(5:8)=0$;
   $V_2(5:8)==V(5:8)$, $V_2(1:4)=0$;
2) $V=e^{-j2\pi[0:N_t/2-1]d\sin\theta_{DOA}}$, $V_1(1:4)=V$, $V_1(5:8)=0$;
   $V_2(5:8)==V$, $V_2(1:4)=0$;

The step S308 is to normalize in amplitude the derived respective sets of coefficients and then multiple them with the square root of P to derive the weight coefficients $W_1$ and $W_2$ of the antennas, where $W_1=V_1\sqrt{P}$ and $W_2=V_2\sqrt{P}$ both in 1*8 dimensions, and P represents the highest one of limited power of the respective antennas specified in the standard.

Second Embodiment

A set of array response vectors V is calculated from estimated DOA, and two sets of coefficients V1 and V2 are generated by allocating parameters according to the numbers of respective sets of transmit antennas of a base station, where e dimensionality of V1 and V2 is V, and V1 has the same first half as a first half of conjugated V and a zero-padded second half, and V2 has the same second half as a second half of conjugated V and a zero-padded first half.

V1 and V2 are multiplied with corresponding codebooks and then applied as weight coefficients of the antennas to dual-stream beamforming. The following two codebook selection schemes can be considered in a particular implementation:

1) A specific set of codebooks is stored, and codebooks are selected alternately or randomly and multiplied with V1 and V2 to obtain W1 and W2.

Due to limited power of each antenna, the limited power is set to P, the highest power M of the respective antennas can be calculated from W1 and W2, a power factor $\sqrt{P/M}$ is calculated, and W1 and W2 are multiplied with the power factor and then applied as weight coefficients of the antennas to dual-stream beamforming for a gain of system performance.

At this time, dual-stream beamforming can be performed with high reliability and low complexity.

2) A specific set of codebooks is stored, and a codebook to maximum a capacity or a signal to noise ratio is selected and multiplied with V1 and V2 to obtain W1 and W2.

Due to limited power of each antenna, the limited power is set to P, the highest power M of the respective antennas can be calculated from W1 and W2, a power factor $\sqrt{P/M}$ is calculated, and W1 and W2 are multiplied with the power factor and then applied as weight coefficients of the antennas to dual-stream beamforming for a gain of system performance.

At this time, dual-stream beamforming can be performed for improved efficiency of transmission at the cost of higher complexity than the scheme 1).

The codebook(s) can be selected at the base station side or can be selected by the UE and then a selection result can be fed back to the base station. The codebook(s) can be an open-loop codebook(s) or can be a closed-loop codebook(s).

The weight coefficients can be calculated at a specific beamforming granularity in order to further lower the complexity in an implementation. For example, DOA angles can be estimated from full-bandwidth channel estimation values H to further derive a set of array response vectors V, and then the full bandwidth can be divided into a plurality of sub-bands at a specific beamforming granularity, and V can be multiplied with a different codebook in each of the sub-bands to derive beamforming coefficients of the each sub-band for dual-stream beamforming. Alternatively DOA angles can be estimated per sub-band to further derive a set of array response vectors V of each sub-band, which is then multiplied with a different codebook to derive beamforming coefficients of the each sub-band for dual-stream beamforming.

Particularly, all the step S201 to the step S203 in this embodiment are the same as those in the first embodiment, and then in the step S204, performing beamforming respectively for the two sets of antennas by the two sets of coefficients particularly includes the steps of:

Selecting at a preset beamforming granularity and multiplying codebooks respectively with the two sets of coefficients to derive two sets of intermediate weight coefficients;

Determining the highest power M of the respective antennas from the two sets of intermediate weight coefficients;

Determining weight coefficients of the antennas as the products of the two respective sets of intermediate weight coefficients and $\sqrt{P/M}$, where P represents limited power of the antennas; and Performing beamforming for the two sets of antennas by the weight coefficients of the antennas.

Figure 4:
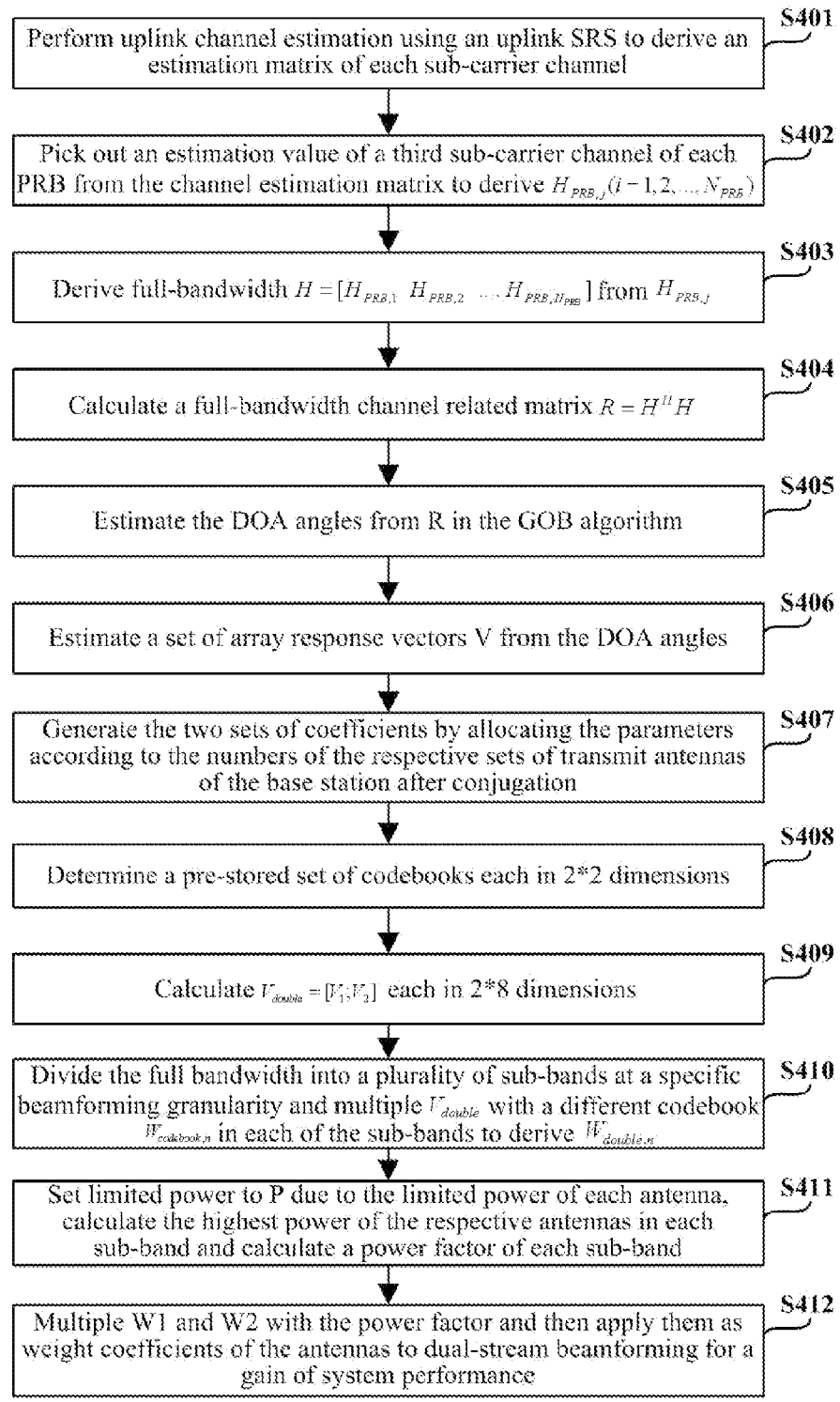
FIG. 4 is a flow chart of a method of dual-stream beamforming in a corresponding second embodiment of the embodiments of the invention.

Particularly as illustrated in FIG. 4, dual-stream beamforming in this embodiment particularly includes the following steps:

The step S401 is to perform uplink channel estimation using an uplink SRS to derive an estimation matrix $H_i$(i=1, 2, ..., 6*$N_{PRB}$) of each sub-carrier channel in 1*8 dimensions, where $N_{PRB}$ represents the number of PRBs occupied by a pilot, and as specified in the protocol, a number of SRS's are placed like a comb, and the number of sub-carriers by occupied the SRS's in a PRB is 6;

The step S402 is to pick out an estimation value of a third sub-carrier channel of each PRB from the channel estimation matrix $H_i$ to derive $H_{PRB,j}$(i=1, 2, ..., $N_{PRB}$) in 1*8 dimensions;

The step S403 is to derive full-bandwidth $H=(H_{PRB,1} H_{PRB,2} ... H_{PRB,N_{PRB}})$ from $H_{PRB,j}$ in $N_{PRB}$*8 dimensions:

The step S404 is to calculate a full-bandwidth channel related matrix $R=H^H H$ in 8*8 dimensions;

The step S405 is to estimate the DOA angles $\theta_{DOA}$ from R in the GOB algorithm;

The step S406 is to estimate a set of array response vectors V in 1*8 dimensions, particularly as $V=e^{-j2\pi[0:N_t-1]d\sin\theta_{DOA}}$, from $\theta_{DOA}$, where $N_t$ represents the number of transmit antennas of the base station, and d represents the spacing between the antennas of the base station;

The step S407 is to generate the two sets of coefficients $V_1$ and $V_2$ both in 1*8 dimensions by allocating the parameters according to the numbers of the respective sets of transmit antennas of the base station after conjugating $V_n$:

$V_1(1:4)=V^*(1:4)$, $V_1(5:8)=0$;
$V_2(5:8)==V^*(5:8)$, $V_2(1:4)=0$;

Where V* represents vectors of conjugated V;

In an implementation, the step S406 and the step S407 can alternatively be performed in the following two implementations:

1) $V=e^{-j2\pi[0:N_t-1]d\sin\theta_{DOA}}$, $V_1(1:4)=V(1:4)$, $V_1(5:8)=0$;
   $V_2(5:8)==V(5:8))$, $V_2(1:4)=0$;
2) $V=e^{-j2\pi[0:N_t/2-1]d\sin\theta_{DOA}}$, $V_1(1:4)=V$, $V_1(5:8)=0$;
   $V_2(5:8)==V$, $V_2(1:4)=0$;

The step S408 is to determine a pre-stored set of codebooks each in 2*2 dimensions.

The step S409 is to calculate $V_{double}=[V_1;V_2]$ each in 2*8 dimensions;

The step S410 is to divide the full bandwidth into a plurality of sub-bands at a specific beamforming granularity and to multiple $V_{double}$ with a different codebook $W_{codebook,n}$ in each of the sub-bands to derive $W_{double,n}$ with n=1, 2, ..., $N_{PRB}$/$n_{PRB}$, where $N_{PRB}$ represents the number of PRBs occupied by a pilot, and $n_{PRB}$ represents the beamforming granularity, i.e., $W_{double,n} = W_{codebook,n} V_{double}$;

The codebook(s) can be selected in the following two schemes: a codebook is selected alternately or randomly from the set of codebooks, or a codebook to maximum a capacity or a signal to noise ratio is selected from the set of codebooks. The set of codebooks can be a set of codebooks specified in the LTE standard or can be another appropriate set of codebooks;

The step S411 is to set limited power to P to the limited power of each antenna, to calculate the highest power $M_n$ of the respective antennas in each sub-band and to calculate a power factor $$\rho_n = \sqrt{\frac{P}{M_n}}$$

of each sub-band; and

The step S412 is to multiple W1 and W2 with the power factor and then apply them as weight coefficients of the antennas to dual-stream beamforming for a gain of system performance.

In a particular implementation, the step S411 and the step S412 can be performed by of normalizing in amplitude the largest element of $W_{double,n}$ and then multiplying them with the square root of P and further applying them as the weight coefficients of the antennas to dual-stream beamforming.

Figure 5:
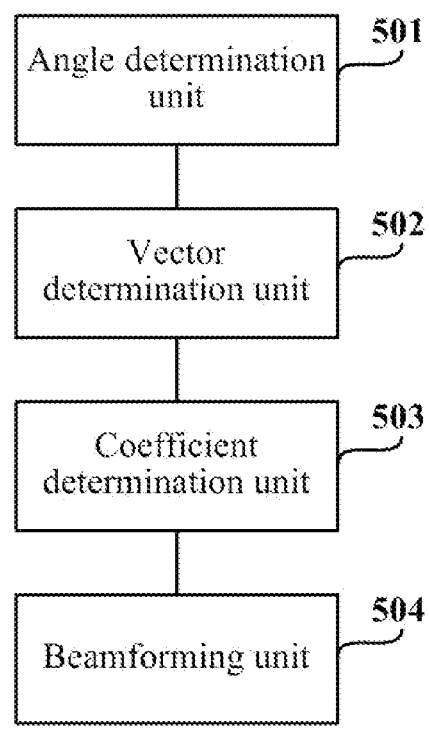
FIG. 5 is a schematic structural diagram of an apparatus for dual-stream beamforming of an embodiment of the invention.

An embodiment of the invention further correspondingly provides an apparatus for dual-stream beamforming, and as illustrated in FIG. 5, the apparatus includes:

An angle determination unit 501 is configured to determine DOA angles of antennas;

A vector determination unit 502, is configured to determine array response vectors from the DOA angles;

A coefficient determination unit 503 is configured to generate two sets of coefficients from the array response vectors by allocating parameters according to the numbers of respective sets of transmit antennas of a base station; and A beamforming unit 504 is configured to perform beamforming respectively for two sets of antennas by the two sets of coefficients.

Particularly the angle determination unit 501 is particularly configured:

To perform uplink channel estimation using an uplink pilot of a full bandwidth or a preset sub-band to determine a channel matrix;

To determine a channel related matrix from the channel matrix; and

To determine the DOA angles of the antennas from the channel related matrix.

The vector determination unit 502 is particularly configured:

To determine the array response vectors as $V = e^{-j2\pi[0:N_t-1]d \sin \theta_{DOA}}$, where $N_t$ represents the number of transmit antennas of the base station, and d represents the spacing between the antennas of the base station.

At this time the coefficient determination unit 503 is particularly configured:

To determine the dimensionality of the two sets of coefficients to be the same as the dimensionality of the array response vectors;

To determine parameters of a first half of the first set of coefficients to be the same as parameters of a first half of the conjugated array response vectors and to determine parameters of a second half of the first set of coefficients to be zero; and To determine parameters of a second half of the second set of coefficients to be the same as the parameters of the first half of the conjugated array response vectors and to determine parameters of a first half of the second set of coefficients to be zero.

Alternatively the vector determination unit 502 is particularly configured:

To determine the array response vectors as $V = e^{-j2\pi[0:N_t-1]d \sin \theta_{DOA}}$, where $N_t$ represents the number of transmit antennas of the base station, and d represents the spacing between the antennas of the base station.

At this time the coefficient determination unit 503 is particularly configured:

To determine the dimensionality of the two sets of coefficients to be the same as the dimensionality of the array response vectors;

To determine parameters of a first half of the first set of coefficients to be the same as parameters of a first half of the array response vectors and to determine parameters of a second half of the first set of coefficients to be zero; and To determine parameters of a second half of the second set of coefficients to be the same as the parameters of the first half of the array response vectors and to determine parameters of a first half of the second set of coefficients to be zero.

Alternatively the vector determination unit 502 is particularly configured:

To determine the array response vectors as $V = e^{-j2\pi[0:N_t/2-1]d \sin \theta_{DOA}}$, where $N_t$ represents the number of transmit antennas of the base station, and d represents the spacing between the antennas of the base station.

At this time the coefficient determination unit 503 is particularly configured:

To determine the dimensionality of the two sets of coefficients to be twice the dimensionality of the array response vectors;

To determine parameters of a first half of the first set of coefficients to be the same as parameters of the array response vectors and to determine parameters of a second half of the first set of coefficients to be zero; and To determine parameters of a second half of the second set of coefficients to be the same as the parameters of the array response vectors and to determine parameters of a first half of the second set of coefficients to be zero.

The beamforming unit 504 is particularly configured:

To normalize in amplitude the two sets of coefficients;

To determine weight coefficients of the antennas as the product of the normalized coefficients and $\sqrt{P}$, where P represents limited power of the antennas; and To perform beamforming for the two sets of antennas by the weight coefficients of the antennas.

Or the beamforming unit 504 is particularly configured:

To select codebooks at a preset beamforming granularity to multiply respectively with the two sets of coefficients to derive two sets of intermediate weight coefficients;

To determine the highest power M of the respective antennas from the two sets of intermediate weight coefficients;

To determine weight coefficients of the antennas as the products of the two respective sets of intermediate weight coefficients and $\sqrt{P/M}$, where P represents limited power of the antennas; and To perform beamforming for the two sets of antennas by the weight coefficients of the antennas.

The embodiments of the invention provide a method of and apparatus for dual-stream beamforming, where firstly array response vectors are determined from DOA angles; and then two sets of coefficients are generated from the array response vectors by allocating parameters according to the numbers of respective sets of transmit antennas of a base station, and beamforming is performed for the antennas by the two sets of coefficients without deriving any eigen-vector as a result of eigen-value decomposition, thus lowering the complexity of dual-stream beamforming.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of dual-stream beamforming, comprising:
determining Direction Of Arrival (DOA) angles of antennas;
determining array response vectors from the DOA angles;
generating two sets of coefficients from the array response vectors by allocating parameters according to the numbers of respective sets of transmit antennas of a base station; and
performing beamforming respectively for two sets of antennas by the two sets of coefficients;
wherein the determining the DOA angles of the antennas comprises:
performing uplink channel estimation using an uplink pilot of a full bandwidth or a preset sub-band to determine a channel matrix;
determining a channel related matrix from the channel matrix; and
determining the DOA angles of the antennas from the channel related matrix.

2. The method of claim 1, wherein the determining the array response vectors from the DOA angles comprises:
determining the array response vectors as $V=e^{-j2\pi[0:N_t-1]d \sin \theta_{DOA}}$, wherein $N_t$ represents the number of transmit antennas of the base station, and d represents the spacing between the antennas of the base station.

3. The method of claim 2, wherein the generating the two sets of coefficients from the array response vectors by allocating the parameters according to the numbers of respective sets of transmit antennas of the base station comprises:
determining the dimensionality of the two sets of coefficients to be the same as the dimensionality of the array response vectors;
determining parameters of a first half of the first set of coefficients to be the same as parameters of a first half of the conjugated array response vectors and determining parameters of a second half of the first set of coefficients to be zero; and
determining parameters of a second half of the second set of coefficients to be the same as the parameters of the first half of the conjugated array response vectors and determining parameters of a first half of the second set of coefficients to be zero.

4. The method of claim 1, wherein the determining the array response vectors from the DOA angles comprises:
determining the array response vectors as $V=e^{-j2\pi[0:N_t-1]d \sin \theta_{DOA}}$, wherein $N_t$ represents the number of transmit antennas of the base station, and d represents the spacing between the antennas of the base station.

5. The method of claim 4, wherein the generating the two sets of coefficients from the array response vectors by allocating the parameters according to the numbers of respective sets of transmit antennas of the base station comprises:
determining the dimensionality of the two sets of coefficients to be the same as the dimensionality of the array response vectors;
determining parameters of a first half of the first set of coefficients to be the same as parameters of a first half of the array response vectors and determining parameters of a second half of the first set of coefficients to be zero; and
determining parameters of a second half of the second set of coefficients to be the same as the parameters of the first half of the array response vectors and determining parameters of a first half of the second set of coefficients to be zero.

6. The method of claim 1, wherein the determining the array response vectors from the DOA angles comprises:
   determining the array response vectors as $V=e^{-j2\pi[0:N_t/2-1]d \sin \theta_{DOA}}$, wherein $N_t$ represents the number of transmit antennas of the base station, and d represents the spacing between the antennas of the base station.

7. The method of claim 6, wherein the generating the two sets of coefficients from the array response vectors by allocating the parameters according to the numbers of respective sets of transmit antennas of the base station comprises:
   determining the dimensionality of the two sets of coefficients to be twice the dimensionality of the array response vectors;
   determining parameters of a first half of the first set of coefficients to be the same as parameters of the array response vectors and determining parameters of a second half of the first set of coefficients to be zero; and
   determining parameters of a second half of the second set of coefficients to be the same as the parameters of the array response vectors and determining parameters of a first half of the second set of coefficients to be zero.

8. The method of claim 1, wherein the performing beamforming respectively for two sets of antennas by the two sets of coefficients comprises:
   normalizing in amplitude the two sets of coefficients;
   determining weight coefficients of the antennas as the product of the normalized coefficients and $\sqrt{P}$, wherein P represents limited power of the antennas; and
   performing beamforming for the two sets of antennas by the weight coefficients of the antennas.

9. The method of claim 1, wherein the performing beamforming respectively for two sets of antennas by the two sets of coefficients comprises:
   selecting codebooks at a preset beamforming granularity to multiply respectively with the two sets of coefficients to derive two sets of intermediate weight coefficients;
   determining the highest power M of the respective antennas from the two sets of intermediate weight coefficients;
   determining weight coefficients of the antennas as the products of the two respective sets of intermediate weight coefficients and $\sqrt{P/M}$, where P represents limited power of the antennas; and
   performing beamforming for the two sets of antennas by the weight coefficients of the antennas.

10. An apparatus for dual-stream beamforming, comprising:
    an angle determination unit is configured to determine Direction Of Arrival (DOA) angles of antennas;
    a vector determination unit is configured to determine array response vectors from the DOA angles;
    a coefficient determination unit is configured to generate two sets of coefficients from the array response vectors by allocating parameters according to the numbers of respective sets of transmit antennas of a base station; and
    a beamforming unit is configured to perform beamforming respectively for two sets of antennas by the two sets of coefficients;
    wherein the angle determination unit is further configured:
    to perform uplink channel estimation using an uplink pilot of a full bandwidth or a preset sub-band to determine a channel matrix;
    to determine a channel related matrix from the channel matrix; and
    to determine the DOA angles of the antennas from the channel related matrix.

11. The apparatus of claim 10, wherein the vector determination unit is further configured:
    to determine the array response vectors as $V=e^{j2\pi[0:N_t-1]d \sin \theta_{DOA}}$, wherein $N_t$ represents the number of transmit antennas of the base station, and d represents the spacing between the antennas of the base station.

12. The apparatus of claim 11, wherein the coefficient determination unit is further configured:
    to determine the dimensionality of the two sets of coefficients to be the same as the dimensionality of the array response vectors;
    to determine parameters of a first half of the first set of coefficients to be the same as parameters of a first half of the conjugated array response vectors and to determine parameters of a second half of the first set of coefficients to be zero; and
    to determine parameters of a second half of the second set of coefficients to be the same as the parameters of the first half of the conjugated array response vectors and to determine parameters of a first half of the second set of coefficients to be zero.

13. The apparatus of claim 10, wherein the vector determination unit is further configured:
    to determine the array response vectors as $V=e^{-j2\pi[0:N_t-1]d \sin \theta_{DOA}}$, wherein $N_t$ represents the number of transmit antennas of the base station, and d represents the spacing between the antennas of the base station.

14. The apparatus of claim 13, wherein the coefficient determination unit is further configured:
    to determine the dimensionality of the two sets of coefficients to be the same as the dimensionality of the array response vectors;
    to determine parameters of a first half of the first set of coefficients to be the same as parameters of a first half of the array response vectors and to determine parameters of a second half of the first set of coefficients to be zero; and
    to determine parameters of a second half of the second set of coefficients to be the same as the parameters of the first half of the array response vectors and to determine parameters of a first half of the second set of coefficients to be zero.

15. The apparatus of claim 10, wherein the vector determination unit is further configured:
    to determine the array response vectors as $V=e^{-j2\pi[0:N_t/2-1]d \sin \theta_{DOA}}$, wherein $N_t$ represents the number of transmit antennas of the base station, and d represents the spacing between the antennas of the base station.

16. The apparatus of claim 15, wherein the coefficient determination unit is further configured:
    to determine the dimensionality of the two sets of coefficients to be twice the dimensionality of the array response vectors;
    to determine parameters of a first half of the first set of coefficients to be the same as parameters of the array response vectors and to determine parameters of a second half of the first set of coefficients to be zero; and
    to determine parameters of a second half of the second set of coefficients to be the same as the parameters of the array response vectors and to determine parameters of a first half of the second set of coefficients to be zero.

17. The apparatus of claim 10, wherein the beamforming unit is further configured:
    to normalize in amplitude the two sets of coefficients;
    to determine weight coefficients of the antennas as the product of the normalized coefficients and $\sqrt{P}$, wherein P represents limited power of the antennas; and to perform beamforming for the two sets of antennas by the weight coefficients of the antennas.

18. The apparatus of claim 10, wherein the beamforming unit is further configured:
- to select codebooks at a preset beamforming granularity to multiply respectively with the two sets of coefficients to derive two sets of intermediate weight coefficients;
- to determine the highest power M of the respective antennas from the two sets of intermediate weight coefficients;
- to determine weight coefficients of the antennas as the products of the two respective sets of intermediate weight coefficients and $\sqrt{P/M}$, wherein P represents limited power of the antennas; and
- to perform beamforming for the two sets of antennas by the weight coefficients of the antennas.

* * * * *